United States Patent
Rinaldi

[11] Patent Number: 6,108,048
[45] Date of Patent: Aug. 22, 2000

[54] SYSTEM AND METHOD FOR COMPENSATING AGAINST FALSE COLOR FROM COMPOSITE VIDEO SOURCE INFORMATION

[75] Inventor: Antonio Rinaldi, Maple, Canada

[73] Assignee: ATI Technologies, Inc., Thornhill, Canada

[21] Appl. No.: 09/088,560

[22] Filed: Jun. 2, 1998

[51] Int. Cl.[7] .................................................. H04N 9/78
[52] U.S. Cl. .................... 348/665; 348/631; 348/624; 348/666
[58] Field of Search .................. 348/663, 665, 348/666, 667, 630, 631, 624; H04N 9/78

[56] References Cited

U.S. PATENT DOCUMENTS

| | | | |
|---|---|---|---|
| 5,361,103 | 11/1994 | Naka et al. | 348/663 |
| 5,594,508 | 1/1997 | Penney | 348/665 |

FOREIGN PATENT DOCUMENTS

| | | | |
|---|---|---|---|
| 0184492 | 8/1991 | Japan | H04N 9/78 |

OTHER PUBLICATIONS

Video Demystified, by Keith Jack (1997), Chapter 6, pp. 282–296.

*Primary Examiner*—Victor R. Kostak
*Attorney, Agent, or Firm*—Markison & Reckamp, P.C.

[57] ABSTRACT

A system and method for compensating against false color from composite video source information detects when there is a diagonal luminance transition (or a cross pattern) and attenuates combed chrominance information to facilitate a reduction in a false coloring effect. A programmable threshold diagonal transition detector generates a multi-level compensation control signal, such as the amount of chrominance reduction or attenuation (in dB) to effectively notch combed chrominance data, based on a detection of a diagonal transition of luminance data among lines of video data. The multi-level compensation control signal is used by a multi-level compensator to attenuate the combed chrominance information from the 2-D adaptive comb filter.

18 Claims, 6 Drawing Sheets

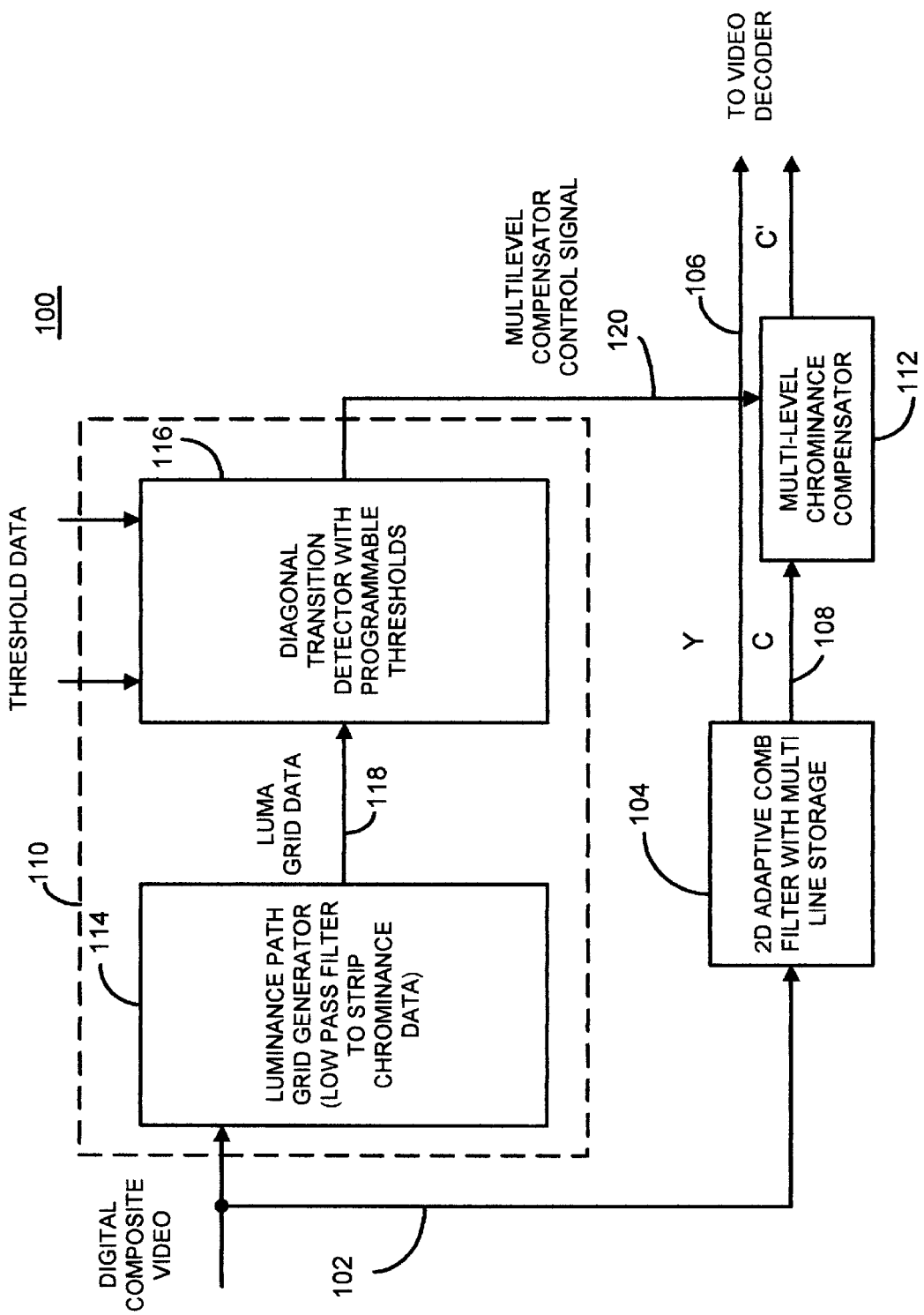

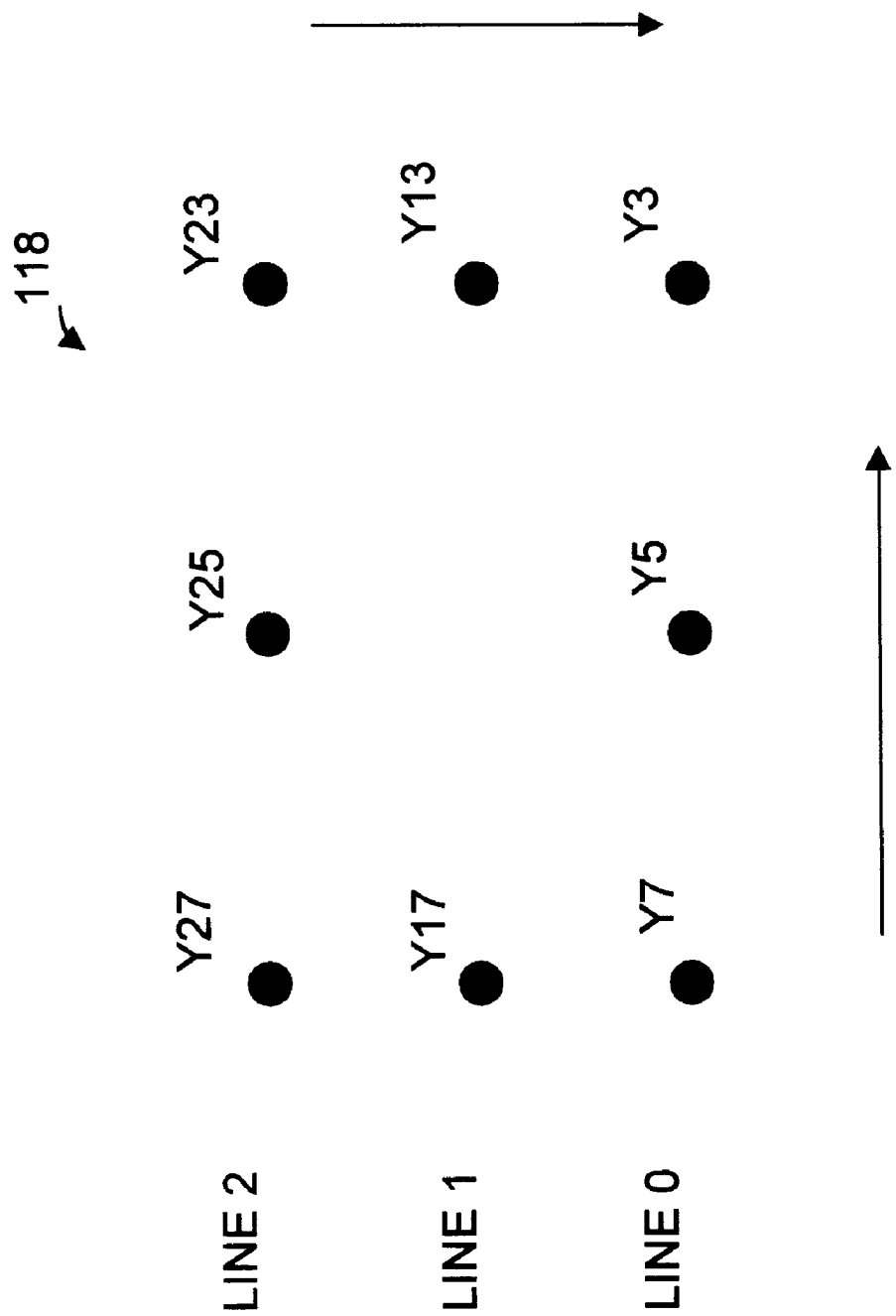

SYSTEM AND METHOD FOR COMPENSATING AGAINST FALSE COLOR FROM COMPOSITE VIDEO SOURCE INFORMATION

FIELD OF THE INVENTION

The invention relates generally to systems and methods for compensating against false color from composite video information, and more particularly to systems and methods for compensating against false color occurrences using comb filter techniques.

BACKGROUND OF THE INVENTION

It is well known that video encoders typically combine luminance and chrominance information by adding them together. The result is that the chrominance and high frequency luminance signals occupy the same portion of the frequency spectrum. Consequently, video decoders typically use some form of frequency separation filtering to separate the luminance information from the chrominance information in the composite video source information. When some luminance information is decoded as color information, cross color or false coloring conditions can occur.

Many luminance and chrominance separators are known. One type is a two dimensional (2-D) adaptive comb filter. Such separators are typically used because conventional comb filters have problems with diagonal lines and vertical color changes. Typically, with diagonal lines, after luminance and chrominance separation, the chrominance information may also include the difference between adjacent luminance values which may be interpreted by a decoder as chrominance information. The result may be false color artifacts along the edge of a line. A general discussion of an example of two-dimensional adaptive luminance and chrominance separators may be found for example in a book entitled "Video De-Mystified" authored by Keith Jack (1997), pages 294–298.

Conventional 2-D adaptive luminance and chrominance separators typically look at vertical chrominance data over multiple lines and also evaluates for horizontal chrominance information. Such filters are adaptive in that they evaluate if there is a difference between vertical and horizontal chrominance information. However, a problem arises with these separators because these separators typically choose horizontal chrominance information when there is a difference. An additional problem arises if the video image is black and white diagonal luminance information, since the luminance information can still bleed into the chrominance data.

The use of notch filtering is also known to notch out at the color burst frequency during the luminance information frequencies, such as between 0–5 MHz. However, notching out the requisite color burst frequency (hence chrominance information) also notches out luminance information at overlapping frequencies. This can result in distorted images such as a black and white striped shirt appearing gray to an observer. The notched information is typically then passed through a comb filter which then separates the luminance from chrominance information.

Consequently there exists a need for an improved false color compensation system and method for use with composite video source information. It would be desirable if such a system reduced false coloring when the video information includes data representing diagonal black and white transitions and/or black and white cross patterns.

BRIEF DESCRIPTION OF THE DRAWINGS

FIG. 1a is a block diagram illustrating one embodiment of a system for compensating against false color occurrences in accordance with the invention.

FIG. 1b is a diagrammatic illustration of luminance grid data generated by a luminance grid generator in accordance with one embodiment of the invention.

DETAILED DESCRIPTION OF A PREFERRED EMBODIMENT OF THE INVENTION

Figure 2:
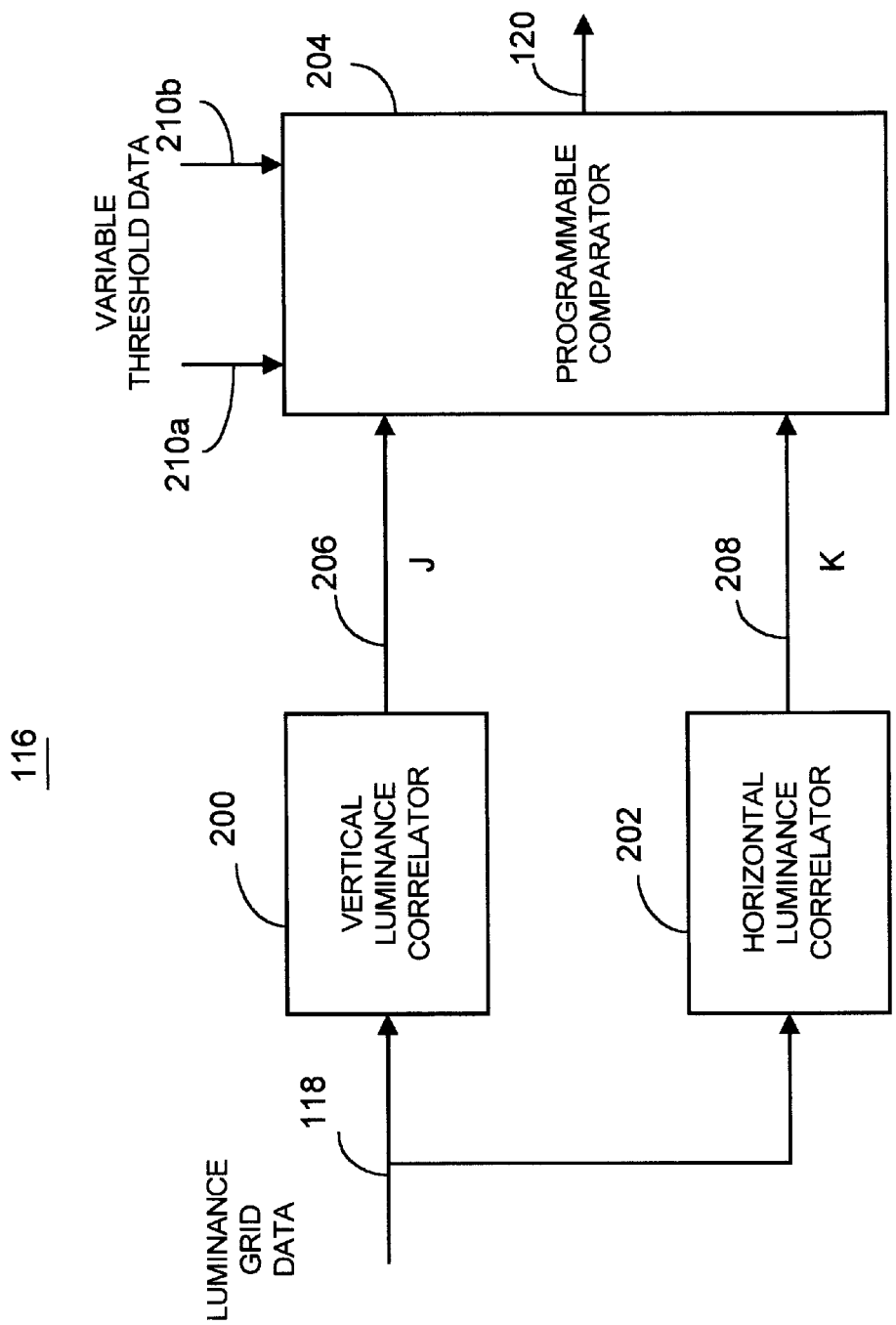
FIG. 2 is a block diagram showing in more detail an example of a diagonal transition detector in accordance with one embodiment of the invention.
Figure 3:
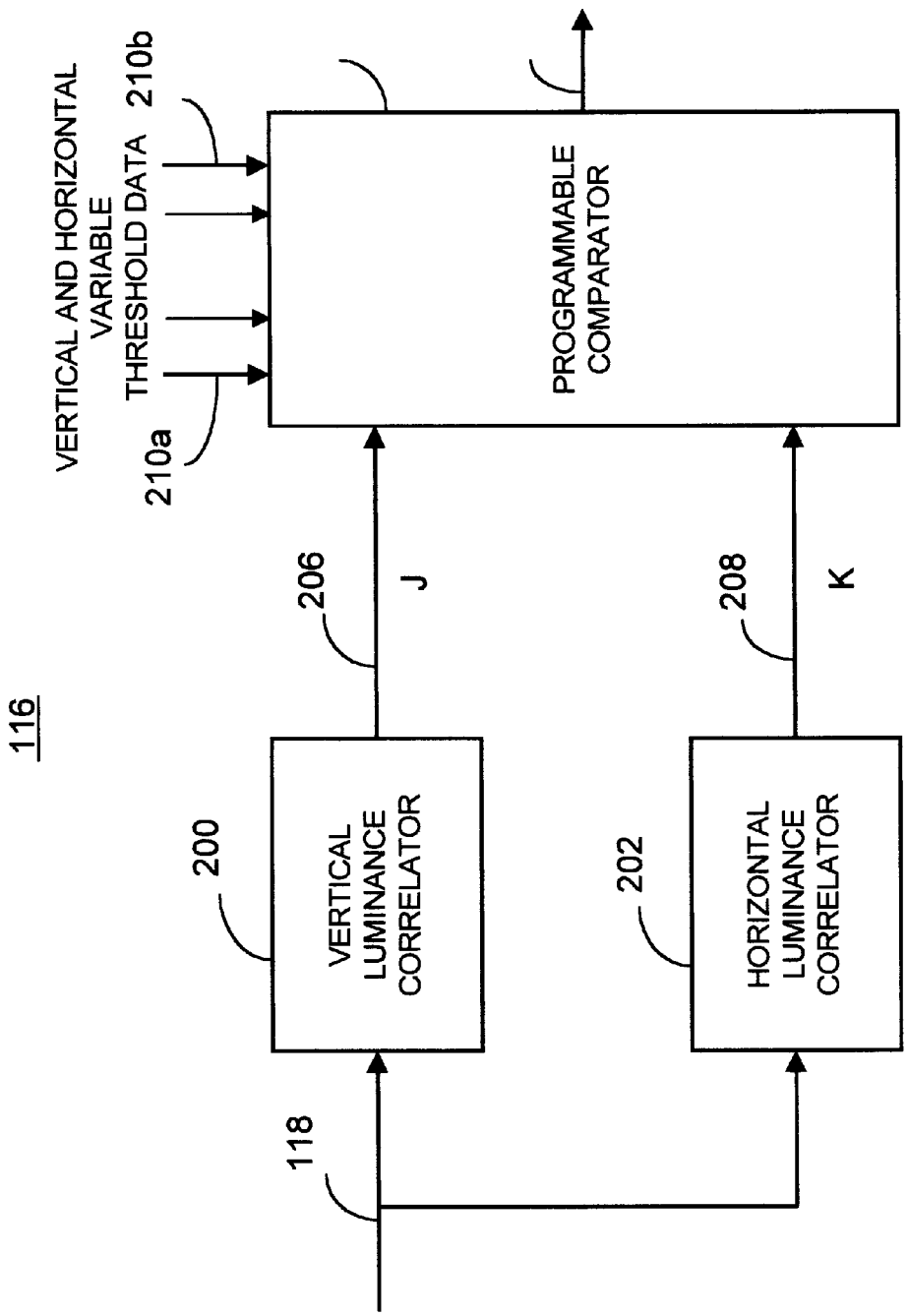
FIG. 3 is a block diagram generally showing one example of a luminance data grid generator in accordance with one embodiment of the invention.

A system and method for compensating against false color from composite video source information detects when there is a diagonal luminance transition (or a cross pattern) and selectively attenuates combed chrominance information to facilitate a reduction in a false coloring effect. In one embodiment, a 2-D adaptive comb filter with line storage capabilities, separates luminance data and chrominance data. A programmable threshold diagonal transition detector receives variable false color threshold data and generates a multi-level compensation control signal, that represents the amount of chrominance reduction or attenuation to more effectively notch combed chrominance data, based on a detection of a diagonal transition of luminance data among lines of video data. The multi-level compensation control signal is used by a multi-level compensator to attenuate the combed chrominance information from the 2-D adaptive comb filter. Hence a notching effect is carried out only on the chrominance information based on diagonal transition detection after it has been combed.

In one embodiment, the programmable diagonal transition detector utilizes a vertical luminance correlator and a horizontal luminance correlator to generate respective correlation data. A programmable comparator uses the correlation data and variable false color threshold data to determine whether there is vertical or horizontal luminance correlation among the received data.

Referring to FIGS. 1a and 1b, a false coloring reduction system 100 receives composite video source information 102 from an analog to digital converter. The false coloring reduction system 100 also includes a 2-D adaptive comb filter 104 that separates the composite video source information 102 into luminance data 106 and combed chrominance data 108. The false coloring reduction system 100 also includes a multi-level chrominance compensation control data generator 110 and a multi-level chrominance compensator 112. The multi-level chrominance compensation control data generator 110 includes a luminance path grid generator 114, such as a digital low pass filter, and a programmable threshold diagonal transition detector 116.

The luminance path grid generator 114 may be, for example, eight-four tap finite impulse response filters that receive the digital composite source information 102. The luminance path grid generator 114 filters chrominance data from the composite signal and generates luminance grid data 118 as shown in FIG. 1b.

The programmable threshold diagonal transition detector 116 evaluates the luminance grid data 118 (FIG. 1b) to determine whether a diagonal transition is detected among a plurality of video samples among a plurality of lines. The programmable threshold diagonal transition detector 116 generates multi-level compensation control signal data 120 indicating the amount of attenuation to apply to chrominance data from the combed chrominance information 108, based on whether a diagonal transition has been detected and the level of correlation among luminance data.

FIG. 1b shows an example of luminance grid data 118 that includes samples of luminance data from a plurality of lines, line 0–line 2. As shown, samples from line 0 include luminance samples $Y_3$, $Y_5$, $Y_7$, whereas samples from line 1 include $Y_{13}$ and $Y_{17}$. Similarly the samples from line 2 include $Y_{2,3}$, $Y_{2,5}$ and Y2,7. The luminance path grid generator 114 may be any suitable digital low pass filter.

FIG. 2 shows one example of the programmable threshold diagonal transition detector 116 having a vertical luminance correlator 200, a horizontal luminance correlator 202 and a programmable comparator 204. The vertical luminance correlator 200 may be any suitable circuitry constructed to serve as a vertical correlation detector as known in the art, such as a circuit that may determine the vertical correlation (J) 206 from the luminance grid data 118 according to the following formula:

$$J = VY\_CORR = ABS\left(\frac{((Y5 - Y25) - (Y27 - Y7) - (Y3 - Y23))}{16}\right)$$

Similarly, the horizontal luminance correlator 202 may be any suitable circuitry that determines the horizontal luminance correlation (K) 208 among the horizontal samples among a plurality of lines 208, such as according to the following formula:

$$K = HY\_CORR = ABS\left(\frac{((Y3 + Y23) - (Y17 - Y13) - Y27 + Y7)}{16}\right)$$

As seen, the magnitude of the vertical correlation J and the horizontal luminance correlation K indicates the degree of correlation. A large number indicates a high degree of correlation which is determined to be a definite transition.

The programmable comparator 204 receives a plurality of programmable threshold data 210a and 210b which may be generated under the control of any suitable logic or processing unit. For example, if a user wishes to vary the degree of false coloring reduction, the thresholds may be reduced such that a very low degree of correlation is necessary before the programmable comparator determines that the requisite correlation is present. If the correlation is above a given threshold, the programmable comparator 204 outputs the requisite multi-level compensator control signal 120 to adjust a level of attenuation of the multichannel chrominance compensator 112 accordingly.

By way of example, threshold data 210a may correspond to the vertical luminance correlation threshold that is desired by a user, whereas threshold level data 210b corresponds to the desired level of correlation for horizontal luminance. The multi-level compensation control signal data 120 may represent for example the amount (in dB) that the combed chrominance information should be attenuated based on the amount of correlation determined by the correlator 200 and 202 in comparison with the variable threshold level data 210a and 210b. As such, threshold data 210a for vertical luminance correlation may be set such that a correlation above a certain amount results in the multilevel compensation control signal data representing a −3 dB attenuation for the combed chrominance data 108 (FIG. 1). Variable threshold data 210a and 210b may be generated by any suitable control logic. For example, the variable threshold data may be selected by user through a graphic user interface that communicates with a microprocessor or other logic to generate the threshold value data.

As an alternative embodiment, multiple thresholds such as two sets of variable threshold data may be generated to achieve a higher degree of selectivity. One set of threshold data would be for vertical luminance correlation level selection and the second set of variable threshold data would be for the horizontal luminance correlation level selection.

Figure 4:
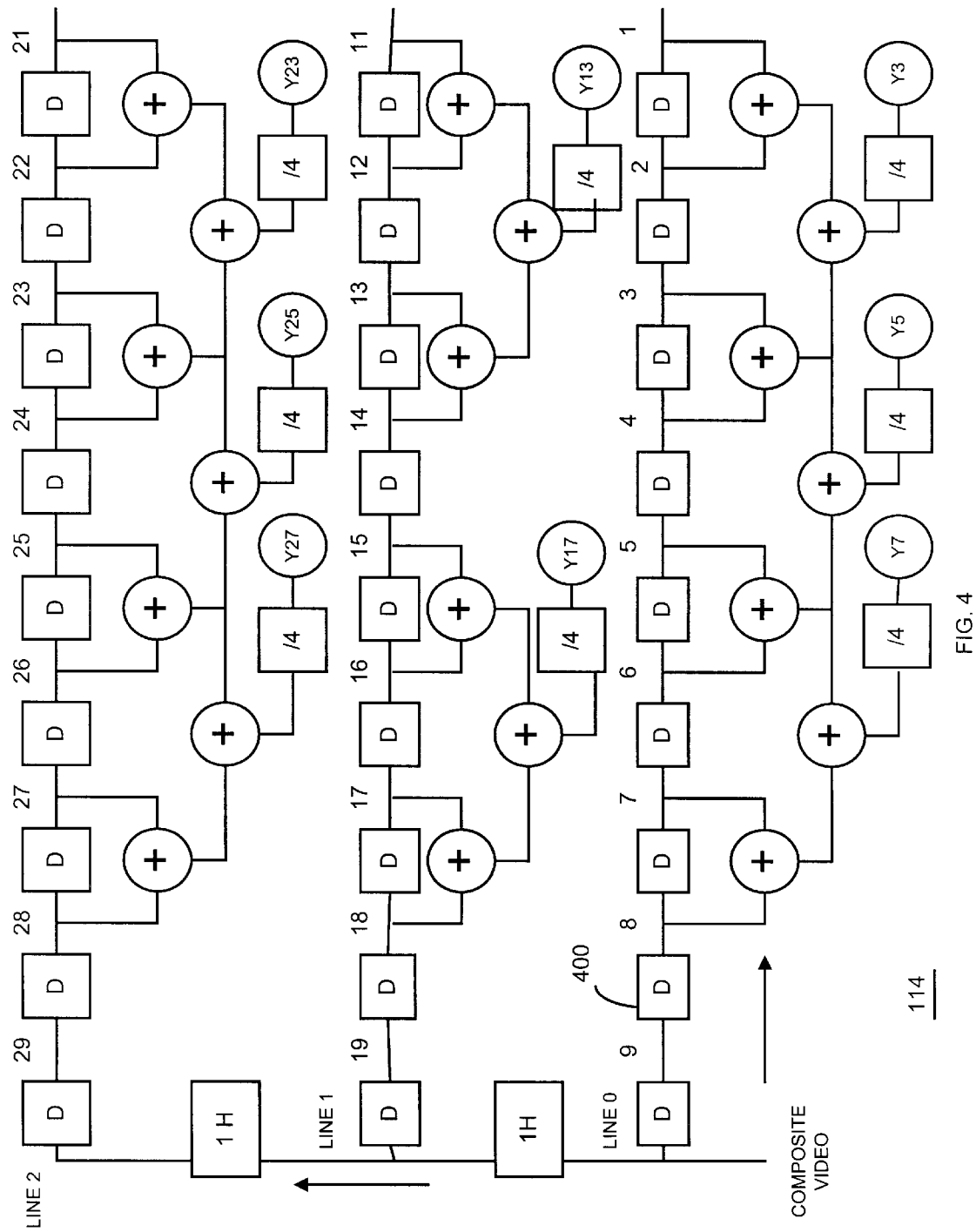
FIG. 4 is a block diagram generally depicting one example of a luminance data grid generator in the form of a four tap finite impulse response filter.

FIG. 4 shows, by way of example, one embodiment of luminance grid data generator 114 having multiple four tap finite impulse response filters. The four tap filter for line 1 is the same configuration as that for line 0 and line 2 but is not shown to simplify the illustration. Preferably, eight such filters can be used, however, it will be recognized that any suitable number may be used. For illustration purposes, only a single sample will be described. As shown, the luminance data grid generator 114 receives a plurality of samples from a plurality of lines, line 0–line 2. A delay block 400 is shown between each of the samples where nine samples are shown for each line. The filtering for vertical luminance sample $Y_3$ includes the value of samples one, two, three and four of line 0 divided by four. Similarly, the value sample for $Y_{1,3}$ for line 1 will include the value of the sample eleven, plus twelve, plus thirteen, plus fourteen divided by 4.

Figure 5:
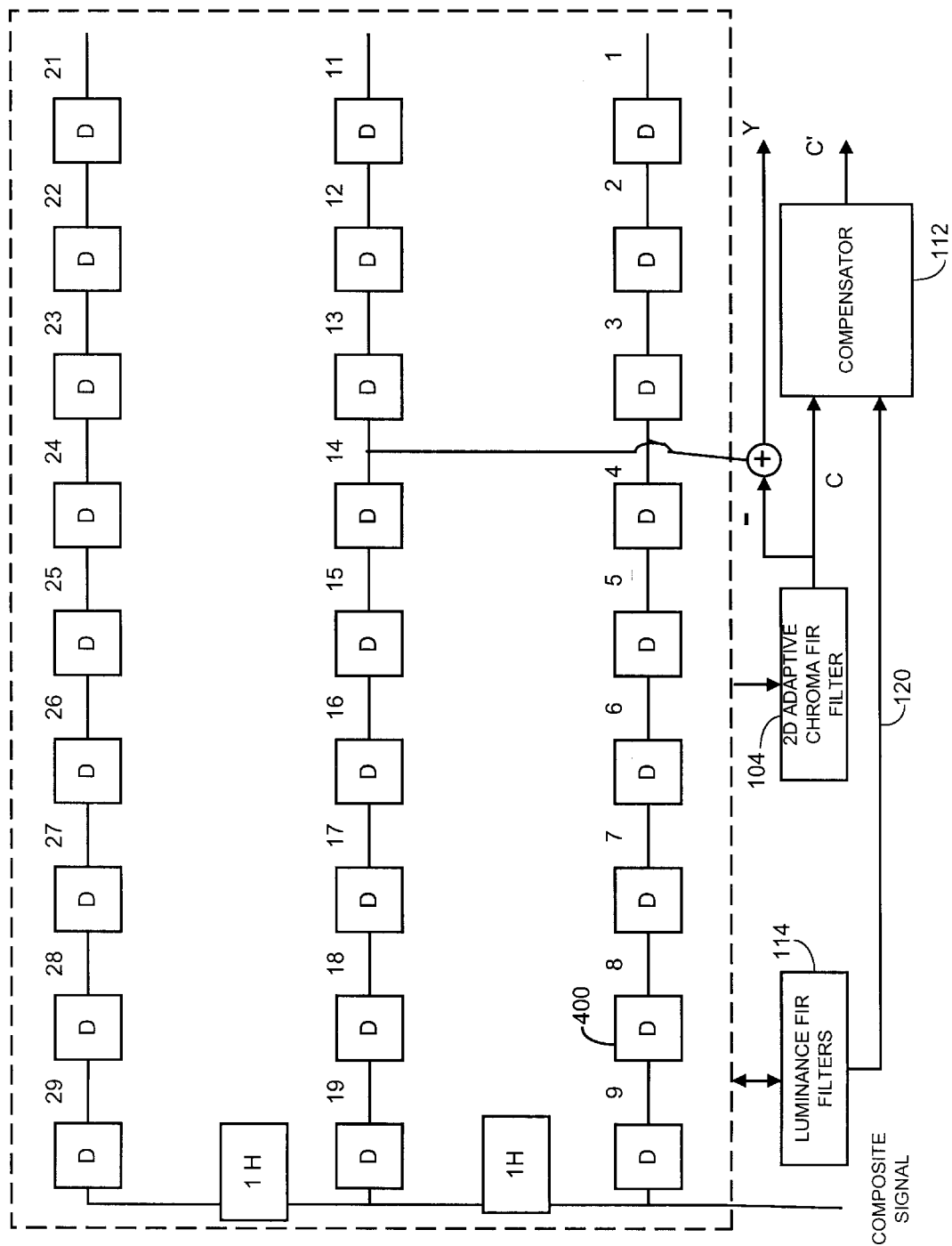
FIG. 5 is a block diagram depicting shared vertical and horizontal delay elements for the luminance data grid generator and a 2-D adaptive chrominance filter in accordance with one embodiment of the invention.

FIG. 5 shows the samples and delay blocks shared as vertical and horizontal delay elements among the 2-D adaptive comb filter 104 and the luminance path grid data generator 114. As shown, chrominance data from the chrominance filter 104 is subtracted from the (Y+C) data from the center grid point. The sharing of delay elements facilitates lower fabrication cost and smaller circuit size to improve the speed of operation.

Accordingly, the disclosed system and method facilitates a reduction in false coloring by selectively attenuating chrominance information that has been combed, based on diagonal transition detection. The variable threshold data is used to facilitate adjustment of false coloring reduction. The multilevel compensation control data represents multiple levels of attenuation depending upon a degree of vertical luminance correlation and horizontal luminance correlation.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A system for compensating against false color from composite video source information comprising:

a composite video separator having an input operative to receive composite video source information and operative to separate the composite video source information into luminance (Y) and combed chrominance (C) information;

a multilevel chrominance compensation control generator, responsive to the composite video source information, operative to output multilevel chrominance compensation control data based on detecting a diagonal transition in luminance data; and a multilevel chrominance compensator operative to receive the combed chrominance information and responsive to the multilevel chrominance compensation control data, that varies the combed chrominance information to facilitate a reduction in false coloring.

2. The system of claim 1 wherein the multilevel chrominance compensator compensates the chrominance information by attenuating the chrominance information.

3. The system of claim 1 wherein the multilevel chrominance compensation control generator includes a filter that filters chrominance information from the composite video source information to produce luminance data.

4. The system of claim 1 wherein the multilevel chrominance compensation control generator includes a vertical luminance correlator circuit and a horizontal luminance correlator operatively coupled to a programmable threshold comparator circuit to facilitate generation of the multilevel chrominance compensation control data.

5. The system of claim 4 wherein the vertical and horizontal luminance correlator circuits include shared delay elements.

6. The system of claim 1 wherein the composite video separator includes a two dimensional adaptive comb filter circuit.

7. The system of claim 1 wherein the multilevel chrominance compensation control generator includes a programmable threshold diagonal detector.

8. The system of claim 3 wherein the filter generates luminance grid data and wherein the diagonal transition detector generates the multilevel compensator control data based on the luminance grid data.

9. A system for compensating against false color from composite video source information comprising:

means for separating the composite video source information into luminance (Y) and combed chrominance (C) information including an adaptive comb filter circuit;

means, responsive to the composite video source information, with programmable thresholds, for generating multilevel chrominance compensation control data based on detecting a diagonal transition in luminance data, including means for filtering chrominance information from the composite video source information to produce luminance data; and means, responsive to the multilevel chrominance compensation control data and responsive to the combed chrominance information, for varying the combed chrominance information to facilitate a reduction in false coloring.

10. The system of claim 9 wherein the means for generating multilevel chrominance compensation data includes a vertical luminance correlator circuit and a horizontal luminance correlator operatively coupled to a programmable threshold comparator circuit to facilitate generation of the multilevel chrominance compensation control data.

11. The system of claim 10 wherein the means for filtering generates luminance grid data and wherein the diagonal transition detector generates the multilevel compensator control data based on the luminance grid data.

12. A method for compensating against false color from composite video source information comprising:

separating the composite video source information into luminance (Y) and combed chrominance (C) information;

generating multilevel chrominance compensation control data based on detecting a diagonal transition in luminance data; and varying the combed chrominance information to facilitate a reduction in false coloring.

13. The method of claim 12 wherein the step of varying combed chrominance information includes compensating the chrominance information by attenuating the chrominance information.

14. The method of claim 12 wherein generating multilevel chrominance compensation data includes filtering chrominance information from the composite video source information to produce luminance data.

15. The method of claim 12 wherein generating the multilevel chrominance compensation control data includes programmably adjusting threshold levels of a diagonal luminance detector.

16. The method of claim 14 wherein filtering includes generating luminance grid data and wherein the multilevel compensator control data is generated based on the luminance grid data.

17. A method for compensating against false color from composite video source in formation comprising:

separating the composite video source information into luminance (Y) and combed chrominance (C) information using an adaptive comb filter circuit;

generating multilevel chrominance compensation control data based on programmably adjusting chrominance thresholds to detect a diagonal transition in luminance data, including filtering chrominance information from the composite video source information to produce luminance data; and varying the combed chrominance information to facilitate a reduction in false coloring.

18. The method of claim 17 wherein filtering includes generating luminance grid data and wherein the multilevel compensator control data is generated based on the luminance grid data.

* * * * *